E. G. BAILEY.
PRESSURE TIGHT BEARING.
APPLICATION FILED APR. 30, 1913.
1,089,739.
Patented Mar. 10, 1914.
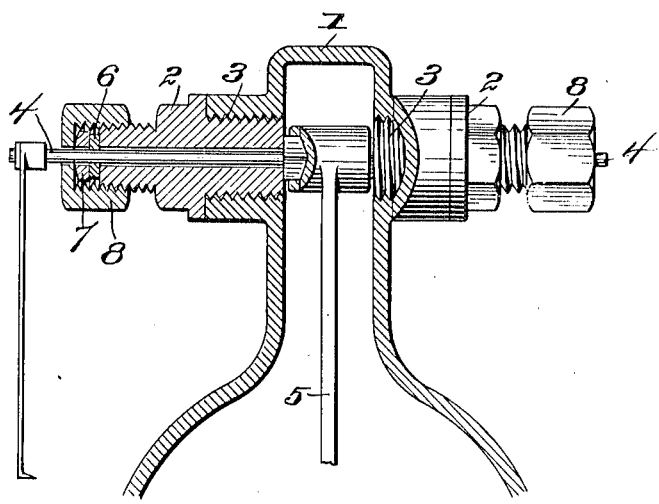

UNITED STATES PATENT OFFICE.

ERVIN G. BAILEY, OF NEWTON HIGHLANDS, MASSACHUSETTS.

PRESSURE-TIGHT BEARING.

1,089,739.  Specification of Letters Patent.  Patented Mar. 10, 1914.

Application filed April 30, 1913. Serial No. 764,500.

*To all whom it may concern:*

Be it known that I, ERVIN G. BAILEY, a citizen of the United States, residing in Newton Highlands, in the county of Middlesex and State of Massachusetts, have invented an Improvement in Pressure-Tight Bearings, of which the following description, in connection with the accompanying drawings, is a specification, like letters on the drawings representing like parts.

The present invention relates to a pressure tight bearing, and is adapted for use where the fluid pressure within the casing, in the wall of which the bearing is formed, is greater or less than that of the atmosphere, as, for example, in the case of a differential pressure gage where the pressure operated devices are inside of a fluid tight casing, while the indicating or recording mechanism is outside, thus necessitating the passage of a shaft or equivalent connecting device through a wall of the casing. In many such instruments, the differences of pressures encountered are very small, and it is, therefore, necessary to eliminate, to the greatest possible extent, the opposition to the movement of the instrument due to the friction in the bearing. The use of an ordinary stuffing box, or a cup leather packing is objectionable for this reason, the former because of the friction due to the pressure needed to keep the packing tight, and the latter because of the fact that the pressure itself acts upon the cup leather to keep the joint tight. Long, parallel metallic bearings have been used in some cases where the spindles are very small, but it is substantially impossible to make such bearings actually pressure tight, and foreign substances gradually work in, thus not only producing friction, but wearing out the bearing.

The bearing embodying the present invention consists of a flat piece of pliable material combined with the spindle which forms the male member of the bearing, the thin piece of pliable material having a hole closely fitting the spindle, it being possible, owing to the nature of the material used, to obtain a fit which is practically pressure tight and capable of withstanding any pressure which is likely to be encountered in an instrument of this type, and at the same time cause a negligible amount of friction. The opening for the spindle through the wall of the casing is slightly larger than the spindle itself, and one side of the said wall at the end of the opening has a suitable surface against which the actual bearing is seated and suitably held. Any material is suitable for the bearing, which is capable of yielding slightly, and has sufficient elasticity to resist permanent displacement around the spindle; and the term "pliable" has been chosen as being capable of use in the sense explained.

The drawing is a horizontal section, partly in elevation, of a bearing embodying the invention.

In the construction shown, the bearing is made double, the spindle extending entirely through a portion of the casing and having bearings at opposite ends, so that the said spindle is balanced, that is, relieved from any end pressure which would result if one end of the spindle were subjected to a pressure greater than the other end.

The invention is shown as applied to a differential pressure gage, a portion of which is shown as in the form of a chamber 1, the side walls of which are provided with bearing supports 2 which are herein shown as secured to the opposite sides of the chamber 1, by means of screw threads 3. The spindle 4, which is actuated from the inside of the chamber by means of any suitable pressure receiving device through the agency of the arm 5, extends in opposite directions through the supporting members 2, the openings in which are slightly larger than the spindle, which is, therefore, not in frictional contact with the walls of the openings.

The actual bearing for the spindle is formed in a flat piece 6 of pliable material, such, for example, as high grade oil tan leather, the spindle tightly fitting in a hole through said flat piece, so that the flat piece constitutes the pressure-tight bearing for the spindle. The said flat piece of material is held in position with the spindle in the larger opening by means of a member 7 which is herein shown as a disk having an opening in line with the main opening for the spindle, the said disk being held against the face of the bearing member by means of a screw threaded thimble 8 screwed on to the threaded end of the bearing member 2. This thimble has an opening for the spindle which is large enough to be out of contact therewith.

While it is not essential to have the bearing members at opposite sides of the actuated arm 5, it is desirable to arrange the entire bearing in this way, so that no endwise pressure is encountered, and a certain amount of friction is thereby obviated.

Claim:

A pressure tight bearing consisting of a spindle extending through an opening in the wall of a casing, said opening being slightly larger in diameter than the diameter of the spindle, combined with a flat piece of pliable material which constitutes a bearing for the spindle and has a hole in which the said spindle fits and bears; and means for holding said flat piece in position to make a pressure tight joint, said flat piece being held solely by confinement on opposite sides and being free from confinement along its entire edge.

In testimony whereof, I have signed my name to this specification in the presence of two subscribing witnesses.

ERVIN G. BAILEY.

Witnesses:
 JAS. J. MALONEY,
 M. E. COVENEY.